May 7, 1963   J. W. SCHAEFER   3,088,606
SWEEP ARM UNLOADER SHIELD MEANS
Filed Aug. 9, 1961   2 Sheets-Sheet 1
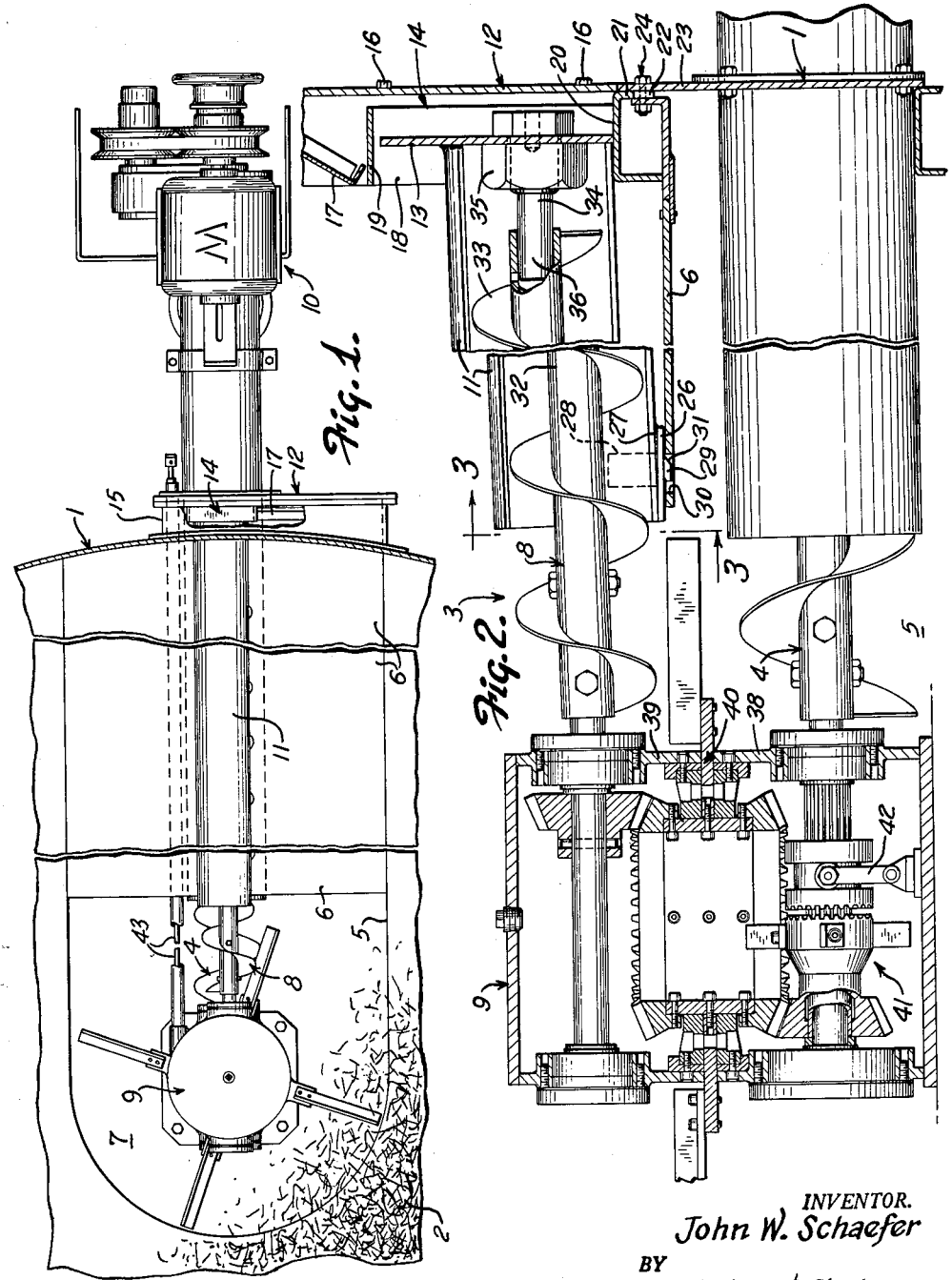
INVENTOR.
John W. Schaefer
BY Andrus & Starke
Attorneys

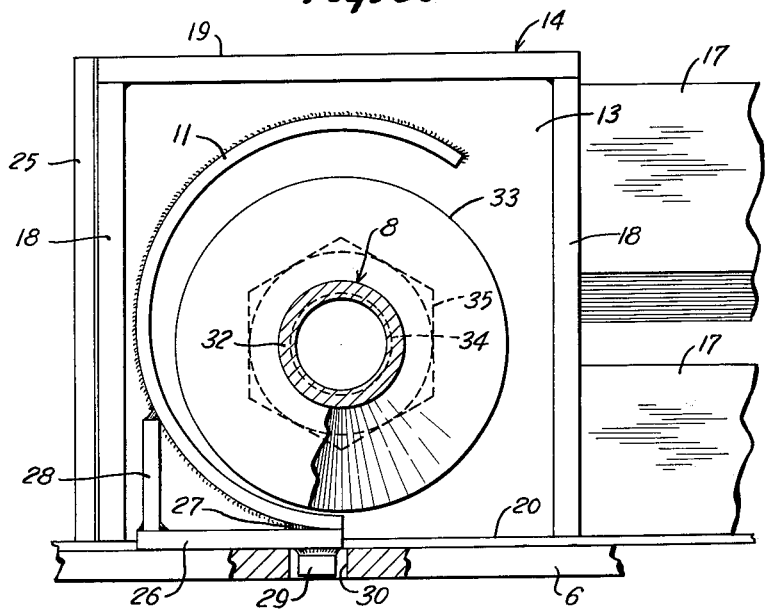
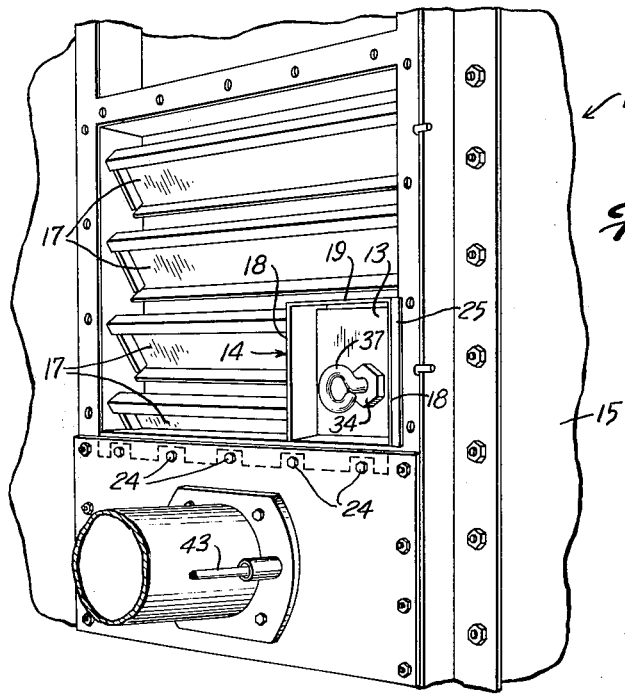

United States Patent Office 3,088,606
Patented May 7, 1963

3,088,606
SWEEP ARM UNLOADER SHIELD MEANS
John W. Schaefer, Kankakee, Ill., assignor, by mesne assignments, to A. O. Smith Harvestore Products, Inc., Kankakee, Ill., a corporation of Delaware
Filed Aug. 9, 1961, Ser. No. 130,293
12 Claims. (Cl. 214—17)

This invention relates to a shield means for a bottom unloading sweep arm which is mounted in the lower end of a relatively large storage structure for movement over the bottom thereof and prevents jamming or packing of the stored material about the sweep arm during the filling of the storage structure.

Grain and similar material may be stored in vertically disposed cylindrical bins. The grain may be discharged through a central opening in the bottom wall or floor by gravity flow into a lateral discharge passage or flow. Under certain conditions, the grain may bridge or arch over the opening and not discharge through the opening. A sweep arm mounted immediately above the floor of the bin may be employed to prevent the bridging action.

The present invention is particularly adapted for use in protection of a sweep arm disposed in the bottom of a vertically disposed cylindrical bin and selectively actuated for removing the stored material, and particularly material such as high moisture grains or the like. The sweep arm may be constructed generally as shown in applicant's copending application which is entitled "Bottom Unloader for Silo Storage Structures" and which was filed August 1, 1960 with Serial No. 46,581, or in the Nadherney Patent 2,702,485 which issued February 22, 1955.

As disclosed in applicant's copending application, the sweep arm may be an auger arm structure which extends radially from the center of the bin floor and terminates generally adjacent the inner surface of the vertical wall of the bin. The sweep auger includes a spiral blade and is adapted to be driven or turned slowly throughout the circumference of the bin while simultaneously rotating the auger about its own axis. The sweep auger is effective to loosen the stored material and to advance it progressively towards the center of the bin from which it is discharged through a suitable discharge passage provided below the floor of the bin and housing a suitable discharge auger or the like.

The material in the bin tends to jam and pack tightly about a sweep auger and imposes extreme torque loads upon the drive and the transmission components for the sweep auger and the discharging means. It has been suggested that a shield be provided encircling or overlying the auger to continuously support the material immediately above the auger; for example, see Holmgreen Patent 1,275,558.

The present invention is particularly directed to the provision of a removable shield for the outer portion of the shield and which prevents the stored material from bearing on the adjacent sweep arm. Releasable holding means are provided to allow the arm to be operated to break a bridge or arch which may form over the discharge opening without indexing of the arm. The shield is removable to permit indexing of the arm and a complete discharge of the material from the bin.

In accordance with the present invention, an arched shield is secured overlying the upper portion or the top of the sweep arm to support the stored material. The shield is temporarily attached with a side opening through which the arm may move or index from beneath the shield. The shield is initially tied to the sweep arm in a manner which permits the arm to transfer material to the discharge opening but prevents indexing of the arm from beneath the shield. Consequently, the initial movement or operation of the arm loosens the material which fills in about the arm between the shield and the discharge opening and beneath the shield. Normally, the sweep arm is maintained inactive so long as the stored material discharges by gravity. If the material bridges over the discharge opening, the sweep arm is actuated, without indexing, and serves to break the bridge and again establish gravity flow.

The gravity feed also stops when the stored material reaches a normal angle of repose against the floor and wall surfaces. The sweep arm is then released and indexed over the floor of the bin to complete the removal of the stored material.

Means are provided for preventing rotation of the shield due to the force reactions of the material on the shield during the initial rotation of the auger about its own axis.

The drawings furnished herewith illustrate the best mode presently contemplated for carrying out the invention.

In the drawings:
FIG. 1 is a top elevational view of an unloader constructed in accordance with the present invention;
FIG. 2 is a side elevational view with a transmission unit coupling a sweep auger to a discharge auger;
FIG. 3 is an enlarged sectional view taken on line 3—3 of FIG. 1; and
FIG. 4 is an enlarged perspective view of a portion of FIGS. 1–3.

Referring to the drawings and particularly to FIGS. 1 and 2, a cylindrical type storage bin 1 is shown in which high moisture grain 2 or other similar material is stored and selectively removed in accordance with known practice. An unloader 3 is mounted in the bottom of the bin 1 for selective discharging of the grain 2. Generally, the unloader 3 includes a discharge auger 4 extending radially from the center to the exterior of the bin within a radial passageway 5 provided immediately beneath the floor level of the bin 1. A floor cover or plate 6 is secured over a great portion of the passageway 5 to prevent the grain 2 from dropping directly in the passageway. The spacing of the floor plate 6 from the center of the bin defines a central discharge opening 7 through which the grain 2 is fed into the discharge auger 4. A sweep auger 8 is provided to insure complete removal of grain 2 and is connected to the discharge auger 4 through a transmission 9 within the central opening 7 and extends radially therefrom terminating adjacent the vertical wall portion of the bin 1. As subsequently described, the sweep auger 8 is adapted to move slowly throughout the circumference of the bin and to transfer the grain 2 into the central opening 7 from which the discharge auger 4 carries the grain through passageway 5 to the exterior of the bin 1.

Suitable drive components 10 are mounted exteriorly of the bin 1 and coupled to drive the discharge auger 4. The operation of the discharge auger 4 is transmitted through transmission 9 to the sweep auger 8. The illustrated transmission 9 as hereinafter described corresponds to the frictional type drive shown in applicant's copending application previously referred to.

In the illustrated embodiment of the invention, a shield 11 encircles one side and the top portion of the sweep auger 8 between the wall of the bin 1 and generally adjacent the outer periphery of the central opening 7. The shield 11 is temporarily mounted as shown and serves to prevent packing of the grain 2 about the sweep auger 8. An access door 12 is provided in the wall of the bin 1 to allow insertion and removal of the shield 11 in a ready and simple manner, as subsequently described.

The shield 11 is generally an arched metal plate extending upwardly from the floor plate 6 and over the top of the sweep auger 8 terminating to define an opening through which the auger 8 can move from beneath the shield 11. An end plate 13 is welded to the outer end of the shield 11 immediately adjacent the outer wall of the bin 1 and is releasably disposed within an access frame assembly 14.

Bin 1 includes an entrance chamber 15 protruding outwardly at ground level and having a door frame to which the outer access door 12 is bolted as by bolts 16. A series of vertically spaced louvers 17 are secured adjacent the inner face of door 12 and span the chamber 15 with the lower louvers abutting the frame assembly 14. Louvers 17 project inwardly and downwardly to prevent the stored grain, not shown, from being discharged when door 12 is removed for inspection, maintenance and the like.

The frame assembly 14 is secured within the lower portion of the opening to the entrance chamber 15, as viewed from the right in FIGS. 1 and 4. Frame assembly 14 includes a substantially square tubular frame structure corresponding to the perimeter of shield end plate 13. The frame structure comprises vertical side walls 18, a top wall or header 19 secured to the upper ends of side walls 18 and a bottom wall or base 20 secured between the side walls 18 somewhat above the lower ends thereof. A vertical attachment foot or plate portion 21 is formed with wall 20 and includes bolt slots 22. The plate portion 21 fits between a lower access door 23, which is secured immediately below door 12 and depending vertical flange on the adjacent portion of the floor plate 6. Bolt and nut units 24 extend through aligned openings in the door 23 and the vertical flange portion and are drawn up to secure the door 23 in position and to simultaneously clamp the frame assembly 14 within the entrance chamber 15.

The frame assembly 14 is secured within the entrance chamber 15 generally in alignment with the sweep auger 8 and with the adjacent louvers 17 abutting and supported on one side wall 18 of the frame assembly. A retaining plate or flange 25 is secured to outermost side wall 18 of frame assembly 14 and bears on the inner side of the adjacent door frame to prevent the grain 2 from forcing the frame outwardly.

The end plate 13 of shield 11 fits within the side walls 18 in the frame assembly 14 and prevents turning of the shield with rotation of sweep auger 8. The sweep auger 8 is supported with the outer end raised slightly to facilitate removal of the shield 11 over the upper edges of the lower access door 23 and the floor plate 6.

A load distributing shoe 26 is welded to the innermost end of the shield 11, as shown in FIGS. 2 and 3, and rests directly on floor plate 6. The slight gap between the outermost portion of the shoe 26 and shield 11, as a result of the angular displacement of the auger 8 and shield 11, is filled by weld and metal 27 transfers the load from the shield to the floor plate. The shoe 26 distributes the weight of the grain 2 on the shield 11 over the floor plate 6. A vertical brace 28 is secured to shoe 26 and projects upwardly into supporting engagement with the back side of the shield 11.

A latch foot 29 is secured to the underside of the shoe 26 and releasably enters into a corresponding opening 30 in the floor plate 6. The foot 29 is generally a flat blocklike member which is welded to shoe 26 and includes a tapered edge 31. The foot 29 in the assembled position interlocks the adjacent end of the shield 11 to the floor plate 6 and prevents shifting thereof. In cooperation with the end plate 13 and frame assembly 14, the foot 29 results in a firm mounting of the shield 11 in position.

The illustrated sweep auger 8 includes a tubular core or shaft 32 carrying a spiral blade 33 which is adapted to loosen and carry the grain 2 into the central opening 7.

In accordance with a feature of the present invention, an interlock or retaining pin 34 is threadedly secured to the end plate 13 by a nut 35 which is secured overlying a properly located opening in end plate 13. The inner end of the pin 34 is a smooth bearing shaft 36 which projects into the end of the hollow sweep auger shaft 32 to interlock the sweep auger 8 to the end plate 13 of the shield 11 and prevent indexing movement of the auger 8. The outer end of the pin 34 is in the form of a hex head and includes a tapped opening for receiving an eye-bolt 37, shown in position in FIG. 4. The eye-bolt 37 is employed to remove the shield 11, as subsequently described.

In the illustrated embodiment of the invention, the sweep auger 8 is connected to the discharge auger 4 through the transmission 9 which corresponds to that shown and more fully described in applicant's previously referred to copending application. Generally, the illustrated transmission includes a lower housing 38 which is stationarily secured within the discharge opening 7 and an upper housing 39 which is rotatably mounted upon the lower housing with frictional drive members 40 for indexing of the sweep auger 8 about the floor of bin 1. The transmission components 41 are secured within the respective housings and interconnect the drive auger 4 to the sweep auger 8 and to the drive members to rotate the sweep auger 8 about its own axis and frictional drive housing 39 to index auger 8. The sweep auger 8 can be held against indexing movement while the drive components 10 are operated to actuate the drive auger 4 and the sweep auger 8 because of the frictional drive connection for indexing.

The transmission 9 includes a clutch 42 for selectively coupling the sweep auger 8 to the drive auger 4. An operating shaft 43 is connected to clutch 42 and extends outwardly adjacent the discharge auger 4. The clutch 42 is engaged and disengaged by longitudinal movement of shaft 43.

The functioning of the illustrated embodiment of the present invention is summarized as follows.

The shield 11 is normally held in place through the engagement of foot 29 within the opening 30 in the floor plate 6 and the engagement of the end plate 13 within the frame assembly 14. The retaining pin 34 holds the auger 8 beneath shield 11. The grain 2 within the bin 1 moves under the force of gravity into the central discharge opening 7. The shield 11 prevents the grain 2 from packing about the sweep auger 8 except for the small portion bridging the area between the central opening 7 and the adjacent end of the shield 11.

When it is desired to withdraw grain from the bin 1, clutch 42 is disengaged and drive components 10 are energized to actuate the discharge auger 4 which transfers the grain 2 from opening 7. The removed grain is replaced by the grain 2 within the bin 1 by gravity flow thereof. In the event the grain bridges over the opening 7, as shown by the phantom line 44, the clutch 42 is engaged to rotate sweep auger 8 and break the grain within the bridge. The interlock pin 34 however prevents the normal indexing of the sweep auger 8 and the power transmitted merely causes the auger 8 to rotate about its own axis. The auger 8 then need only loosen or break the bridging material. As soon as the grain 2 again flows by gravity, the clutch 42 is disengaged.

When the grain 2 in bin 1 reaches the angle of repose against the floor and walls of the bin, the gravity feed will stop. The balance of the grain 2 is selectively removed as follows.

The access door 12 is removed and the retaining pin 34 withdrawn from the end of the auger shaft 32. Clutch 42 is engaged and the drive components 10 energized to simultaneously rotate augers 4 and 8. With pin 34 removed, the auger 8 is also moved or indexed from beneath the shield 11 and sweeps over the bin floor to carry the grain 2 into opening 7.

The clutch 42 is disengaged and the pin 34 threaded into the nut 35 of the shield end plate 13. The eye-bolt 37 is threaded into the tapped opening in the head of pin 34 for removal of the shield 11. Any suitable power equipment, manually or mechanically operated, is connected to the bolt 37 and the shield 11 readily removed from the bin 1.

The illustrated friction drive connection to the sweep auger 8 can be of any suitable slip drive which permits the auger to be held against indexing without damage to the drive components of the drive connection.

The present invention provides a relatively simple and inexpensive means of preventing undue loading of a sweep arm structure mounted within the lower portion of a storage structure. As a result, the drive and transmission components can be constructed with reasonable torque requirements tied to the usual functioning of the unloader and results in increasing of the overall efficiency of the unloader and a substantial reduction in the size and cost of the various unloading components.

In summary, the present invention retains the varying desirable features of a bottom unloader without the normal high torque requirements which have generally been necessary heretofore.

Various modes of carrying out the invention are contemplated as being within the scope of the following claims particularly pointing out and distinctly claiming the subject matter which is regarded as the invention.

I claim:

1. In a bottom unloader unit having a sweep arm supported within a storage structure to transport the stored material to a discharge opening, a shield disposed within the storage structure for overlying the arm in a selected position of the arm, means releasably securing said shield in the storage structure and releasable from outside the storage structure, and means for releasing and removing the shield exteriorly of the storage area of the structure.

2. A shield assembly in combination with a bottom unloader unit having a sweep auger supported within a storage structure for indexing motion about one end of the auger and having a rotating shaft means carrying means for transporting stored material longitudinally of the auger and to a discharge opening, which comprises a shield releasably secured to and within the storage structure overlying the auger in a selected position of the auger and in spaced relation to the discharge opening, retaining means to hold the auger beneath the shield, and means for removing the shield.

3. In a bottom unloader unit having a sweep arm supported for indexing motion about the floor of a storage structure, said sweep arm including a transport member to transport the stored material toward one end of the sweep arm, an arched shield releasably secured to and within the storage structure for overlying the top and trailing portion of the arm, retaining means releasably secured to the sweep arm to restrain indexing motion without interfering with movement of the transport member, and means for removing the shield to allow the arm to sweep the floor of the storage structure after release of the retaining means.

4. In a bottom unloader unit having a sweep arm supported within a storage structure, a shield disposed within the storage structure for overlying the arm, means releasably securing said shield in the storage structure and releasable from outside the storage structure, means to prevent movement of the shield within the storage structure, and means for releasing and removing the shield from outside of the storage structure to allow the arm to sweep the floor of the storage structure.

5. The construction of claim 4 having releasable means connected to the sweep arm and adapted to be fixed against sweeping movement with the arm and removable from outside the storage structure to selectively prevent indexing of the sweep arm.

6. The construction of claim 5 wherein the releasable means includes a cooperating pin and an element having an opening to receive said pin, said pin and said element having the opening being secured one each in the shield assembly and the sweep arm.

7. In a bottom unloader for a storage structure having a sweep arm radially located adjacent the floor of the structure and having a rotatable member for transporting the material within the structure radially of the structure to a discharge means, a slip-type drive connection for angularly indexing the arm over the floor and means for rotating the rotating member, an access cover in the side of the structure and in the horizontal plane of the auger, an arched shield overlying a substantial outer portion of the sweep arm, a load distributing shoe secured to the inner end of the shield, cooperating means on the outer end of the shield and on the inner face of the access cover arranged to prevent rotation of the shield, and cooperating means on the inner end of the shield and the floor of the structure to support the shield against movement.

8. In a storage structure having a sweep arm radially located adjacent the floor of the structure for transferring stored material to a discharge opening and a friction drive for angularly indexing the arm over the floor, an access door in the side of the structure and in the horizontal plane of the auger, an arched shield removably secured to and within the housing in alignment with the access door and extending upwardly from the trailing side of the arm and over the top of the arm terminating in spaced relation to the floor to allow the sweep arm to move from beneath the shield, said shield being spaced from the discharge opening and overlying the outer portion of the sweep arm, and releasable holding means to prevent indexing movement of the sweep arm.

9. In a storage structure having a sweep auger radially located adjacent the floor of the structure and a slip-type drive for angularly indexing the auger over the floor, said auger having a shaft with an end opening adjacent the wall of the storage structure, an access door in the side of the structure and in the horizontal plane of the auger, an arched shield overlying the auger, a load distributing shoe at the radially inner shield end, an end plate secured to the opposite end of the shield, a frame assembly secured within the structure in alignment with the shield and defining an opening accommodating said end plate, louvered means on the inner surface of the access door abutting said frame assembly, a locating member secured to the shoe and fitting into a corresponding opening in the adjacent floor of the storage structure, and a pin means releasably secured to the end plate and projecting into the open end of the auger shaft.

10. In a bottom unloader for a storage structure having a sweep auger radially located adjacent the floor of the structure and a discharge means mounted in a radial passageway beneath the floor of the structure and having a transmission coupling the inner end of the sweep auger to the discharge means, said transmission including a friction drive for angularly indexing the auger over the floor, said auger having a shaft with a tubular end adjacent the wall of the structure, an access door in the side of the structure and in the horizontal plane of the auger, an arched shield projecting upwardly from the floor of the structure on the trailing side of the auger and partially encompassing the auger to define an opening which permits the auger to be indexed from beneath the shield, a load distributing shoe secured to the inner end of the shield and resting on the floor of the structure, a vertical end plate secured to the opposite end of the shield, a frame assembly secured within the opening closed by said access door and defining an interlocking opening to slidably receive the end plate and preventing rotation of the shield, a locating block secured to the shoe and fitting into a corresponding opening in the adjacent floor portion, and an interlock pin means threaded through the vertical end plate and having a smooth inner end projecting into the open end of the auger shaft to allow rotation of the auger and to prevent indexing of the auger.

11. A shield assembly in combination with a bottom unloader unit, comprising a sweep arm supported within a storage structure and including a drive means for indexing motion about one end of the arm and having means for transporting stored material longitudinally of the arm to a discharge opening, a shield secured to and within the storage structure overlying the arm, and releasable retaining means engageable with said arm for selectively holding the arm beneath the shield to prevent indexing motion thereof while permitting transporting of the stored material longitudinally of the arm.

12. The construction of claim 11 wherein the shield overlies the outer portion of the arm outwardly of the discharge opening.

References Cited in the file of this patent

UNITED STATES PATENTS

| | | |
|---|---|---|
| 1,275,558 | Holmgreen | Aug. 13, 1918 |
| 2,233,085 | Schweickart et al. | Feb. 25, 1941 |
| 2,601,049 | Neighbour | June 17, 1952 |